United States Patent [19]

Costarelli

[11] Patent Number: 4,520,724
[45] Date of Patent: Jun. 4, 1985

[54] SCREW DRIER PARTICULARLY FOR PLASTIC MATERIALS

[76] Inventor: Edoardo Costarelli, Via F. Lli Pellas, 34, Perugia, Italy, 06100

[21] Appl. No.: 421,165

[22] Filed: Sep. 22, 1982

[30] Foreign Application Priority Data

Aug. 18, 1982 [IT] Italy ................................ 49003 A/82

[51] Int. Cl.³ .............................................. B30B 9/16
[52] U.S. Cl. .................................... 100/935; 100/117; 100/148
[58] Field of Search ............... 100/117, 145, 147, 148, 100/149, 150, 126, 127, 935; 366/79, 80, 87, 88, 319, 196; 241/82.7

[56] References Cited

U.S. PATENT DOCUMENTS

| | | | |
|---|---|---|---|
| 797,374 | 8/1905 | Roberts | 100/117 X |
| 1,299,524 | 4/1919 | Wertenbruch | 100/117 X |
| 1,809,160 | 6/1931 | Coste | 366/81 |
| 2,560,147 | 7/1951 | Anderson | 100/117 X |
| 2,775,191 | 12/1956 | Youd | 100/148 |
| 2,783,498 | 3/1957 | Richardson | 100/145 UX |
| 2,926,619 | 3/1960 | Kruder | 366/319 X |
| 3,021,254 | 2/1962 | Helversen et al. | 100/126 |
| 3,045,283 | 7/1962 | Keiser | 366/87 X |
| 3,595,533 | 7/1971 | Sutter | 366/88 X |
| 3,652,064 | 3/1972 | Lehnen et al. | 366/88 |
| 3,683,796 | 8/1972 | Miner et al. | 100/149 X |
| 3,946,998 | 3/1976 | Menges et al. | 366/88 |
| 4,054,403 | 10/1977 | Hornbeck et al. | 100/145 X |
| 4,121,967 | 10/1978 | Reinhall | 100/150 X |

FOREIGN PATENT DOCUMENTS

| | | | |
|---|---|---|---|
| 3013091 | 10/1981 | Fed. Rep. of Germany | 100/117 |
| 2413206 | 8/1979 | France | 100/117 |
| 2447269 | 9/1980 | France | 100/117 |
| 928608 | 6/1963 | United Kingdom | 100/117 |

Primary Examiner—Philip R. Coe
Assistant Examiner—Frankie L. Stinson
Attorney, Agent, or Firm—Holman & Stern

[57] ABSTRACT

A tunnel drier particularly for plastic materials has a screw-conveyor operated by an electric motor through a reducer.

The shaft (11) of the screw is suspended rotatably in tapered roller bearings (9). The helical vanes (12) of the screw conveyor advance the material fed through a hopper (5), through a drying channel (4). Halfway between the last turn of the helical vane (12) and disposed at 90° to the shaft (TR'), there is a semicircular section (13) to break up the material before it enters the high pressure area where the action of the advancing screw ends. This area is equipped with openings, in greater density in the high pressure area (6) than in the next section (6'). The shaft (11) is hollow downstream from the helical vane and has openings (6") in the final section. A truncated cone collar (14) and a flap door (7) with adjustable height, facilitate compression inside the channel (4). A blade (8) joined to the free end of the shaft (11) acts as a blade to break up the material before it drops into the container (15). Considerable savings in power requirements and consumption of electricity and fuel are achieved, with respect to tunnel driers, as well as a higher quality product in terms of subsequent treatment (FIG. 3).

8 Claims, 5 Drawing Figures

SCREW DRIER PARTICULARLY FOR PLASTIC MATERIALS

BACKGROUND OF THE INVENTION

1. Field of the Invention

This invention concerns a tunnel drier incorporating a screw conveyor particularly for plastic materials being treated in a recovery and regeneration line for waste plastic.

2. Description of the Prior Art

It is known that thermoplastic materials like PVC, polyethylene, polypropylene, etc. for various uses, such as shopping bags, packing sacks, greenhouse awnings, etc., are recovered after use to be recycled to prepare new products. To this end the waste is run through a series of shearing, washing and regranulation operations to prepare a material in granular form for extrusion or injection. After shearing and washing, and before densification, the washed material must be dried. Currently, this operation is effected in tunnel driers generally powered by diesel fuel, electricity or steam. In all these cases, a large amount of energy is expended for the operation. If oil is used, a supply system must also be installed with a tank, tubes and pump, which of course then require maintenance. Also, if steam is used, a supplementary system is required with a steam generator and distribution network, also requiring maintenance. If electricity is used, costs are extremely high to satisfy the power requirements for the hourly absorption of the resistors which feed the tunnel. Of course, one must in all cases add the costs of installation, maintenance and/or power requirements to the already high cost of the electric power. These power requirements are more or less reproduced as a fixed cost on each invoice from the power supplier. Furthermore, tunnel driers do not give optimal results in terms of the subsequent densification. This is due to the difficulty of the tunnel to optimally absorb the humidity lost by the material being dried.

BRIEF SUMMARY OF THE INVENTION

The object of this invention is thus to produce a means for drying the plastic materials described above, which can considerably reduce energy consumption during operation and which eliminates the installation costs of a fuel delivery system and/or the costs of satisfying excessive power needs, while improving the quality of the dried product.

The fundamental concept of the invention lies in drying the above mentioned materials not by direct action of the heat produced by fuel burners or by electrical resistors, but rather by the application of the well known principle of the press, with the aid of an electric motor and a reducer. The invention involves expelling the water by compressing the material, where said compression in itself generates heat to in turn contribute to the drying.

The drier according to this invention consists essentially of a support chassis or casing and a normal screw of known screw conveyor type in a cylindrical channel on top. At one end of the channel, the screw is supported and rotates via tapered roller bearings, which can thus support considerable pressure. The remaining, longer section of the screw is suspended. The first section of the screw shaft, that is the entire supported rotating section, is solid to withstand the stresses of the support in rotation. The second section of the shaft is equipped with helical vanes or turns, for its entire length, and is hollow to lighten it. The third and final section is also hollow, and has openings which allow the water expelled from the inside of the material being dried to come out through the inside of the shaft rather than through the openings in the casing of the drier. These openings will be discussed in more detail below.

The material to be dried is introduced from above through a hopper in the drier's channel, and is advanced by the screw conveyor for a distance equal to the opening of the hopper, that is approximately half-way down the drying channel, while in the next section of the drying channel near the outlet the material is pressed out without the aid of the vanes of the screw. Therefore, the shaft of the screw is equipped with turns only in the section between the flanges connecting the hopper to the drying channel, corresponding to the entrance. The final turn of the screw goes beyond said flange to end with a section disposed at 90° to the shaft, identical to the 90° section of the first turn. The entire section of the last turn, that is the section which extends beyond the limit of the flange connecting the hopper to the drying channel, is thicker than the other turns. The increased thickness begins at the shaft and tapers off toward the top, so that the turn has a truncated conical section. This device is designed to endure the greater pressures exerted in this area.

Thus, this section is the area of greater pressure. The plastic mass is harder on the inside than on the outside and tends to solidify in layers near the screw shaft, consequently blocking its rotation and therefore material advance.

To avoid this problem, the invention provides devices to break up the material, consisting of a section approximately semi-circular in shape. This section is applied to the shaft of the screw, starting from half-way between the last turn and its final section at 90° to the shaft, until about half a pitch of the screw beyond its end, for an extension no greater than 180°. Said semicircular section is not as high as the turns, and is oriented parallel to them. Along its peripheral edge, there is a sort of bevelling like a sharpening device, which is used like a knife to break up the hardened material and make it crumbly. In this way advancement into the final section of the drying channel is facilitated, where the material is pushed out without the aid of the turns and where, naturally, pressure is greater.

According to the invention, water is expelled through multiple openings in the drier casing corresponding to the outlet section downstream from the flanges connecting the input hopper. To facilitate water expulsion in the high pressure area mentioned above, there is a fairly dense distribution of openings in the area extending from said flange connecting the inlet hopper to just beyond the section of the last turn, descending at 90° to the shaft. The high pressure area thus begins immediately after the last turn, and it is here that most water is expelled. The distribution of the openings may be less dense in the next section.

In order to facilitate compression inside the drying channel, contraction devices are provided at its outlet consisting of a fixed collar, shaped like a truncated cone, applied along the terminal peripherical edge and tapering toward the inside, as well as a hinged flap door adjustable in height at the top edge of said channel, where said flap door cooperates with the collar to slow the material's advance by reducing the diameter of the channel at the outlet.

For some plastic materials, the friction generated by the advancement does not create enough heat to completely evaporate the water. Therefore, to solve this problem, the invention provides for a hollow U-shaped collar welded around the final section of the advancement channel, downstream from the less dense distribution of openings, which contains a heating liquid circulated with a pump. This liquid is heated by electrical resistances, with completely negligible consumption.

The invention also provides, on the section of the screw shaft protruding from the outlet of the drying channel, a type of blade joined to the shaft which serves to break up the material discharged before it falls into the collector, from where a centrifuge will aspirate it and send it up toward a cyclone and then toward the final regeneration phase.

The advantages of the screw drier according to the invention may readily be deduced from the above discussion. The material is dried using an electric motor with reducer, leading to considerable operational savings, both with respect to electricity use and with respect to the consumption of diesel fuel, steam or other heat source. A further considerable saving is achieved by eliminating the cost of large power requirements, both in the initial contract with the supplier and in each monthly bill, since said cost is fixed and independent of effective consumption. At the same time, the costs of installing and maintaining a diesel fuel system are eliminated, as of course are the operational fuel costs. Moreover, the quality of the product in terms of the final regeneration phases is considerably enhanced, since expulsion of the water due to compression is assisted by the evaporation due to the heat generated by friction and, if necessary, by that from the U-shaped collar with the circulating heating liquid. Finally, an increase in hourly yield within reasonable limits maintains the power used by the electric motor at the same level, while using an electrical resistance tunnel would require considerably increased power.

BRIEF DESCRIPTION OF THE DRAWINGS

The invention will now be described in more detail, in an exemplary and non-limiting way, with reference to a preferred embodiment represented in the accompanying drawings wherein.

DETAILED DESCRIPTION

Figure 1:
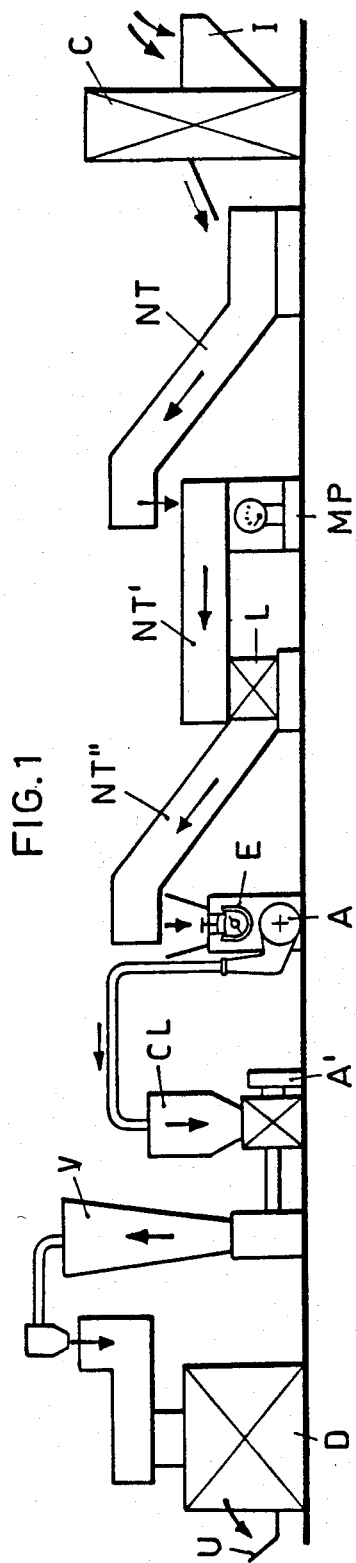
FIG. 1 is a schematic elevational view of a complete line for regerating polyethylene.

FIG. 1 shows an entire line for the recovery and regeneration of plastic materials, particularly polyethylene. In the sequence of the operation, I shows the introduction of material in the shearing machine C, followed by a chain conveyor NT which deposits the cut material on a scale MP. From there, a carpet conveyor belt NT' brings the material to a washing container L, from where a chain conveyor brings it to the dryer E. A first aspirator A draws the material into a cyclone CL, from where a second aspirator A' sends it to a container V for suspension ventilation. The material then passes to the densifier D and outlet U.

Figure 2:
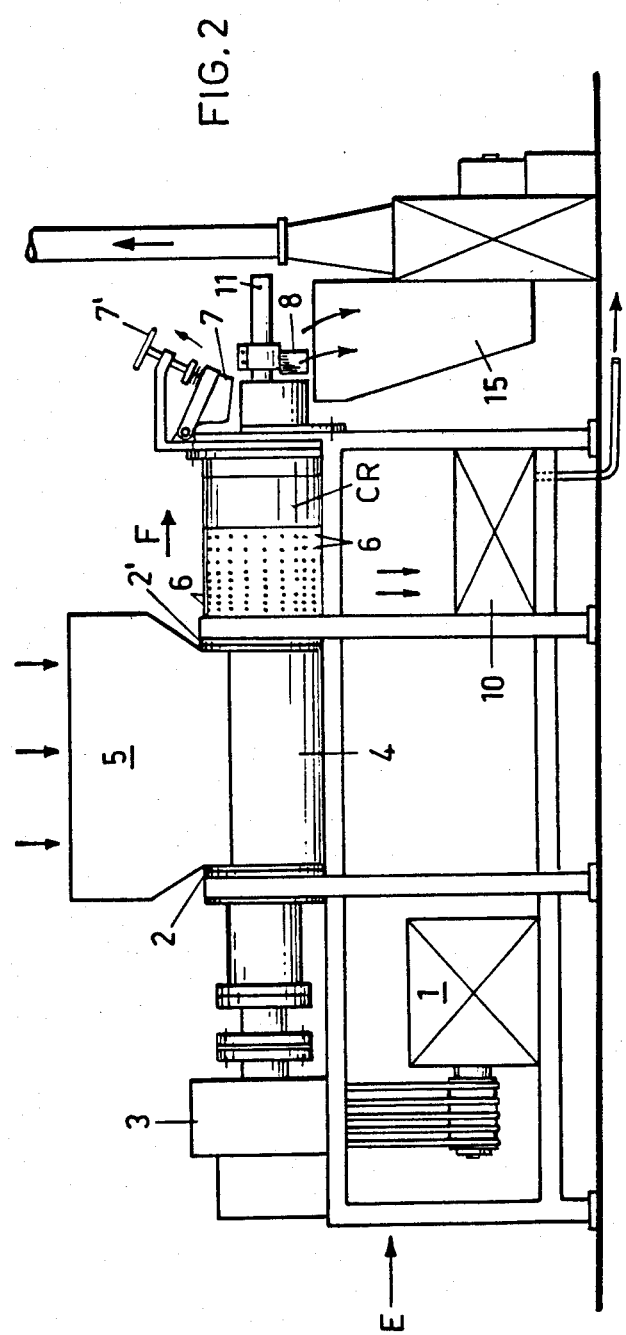
FIG. 2 is a side elevational view of the screw drier according to the invention.

FIG. 2 shows the screw drier according to the invention, indicated generally by E. The arrow F indicates the advancement direction. Via a reducer 3, a motor 1 powers screw a conveyor inside drying channel 4, extending from the first connection flange 2 for hopper 5 for material input, to the end of the drier opposite reducer 3. The more and less dense distributions of openings 6,6' are also shown, although they are more clearly visible in FIG. 3. Also indicated are flap door 7, adjustable in height, the U collar CR where the heating liquid circulates, and the blade 8 for breaking up the discharged material.

Figure 3:
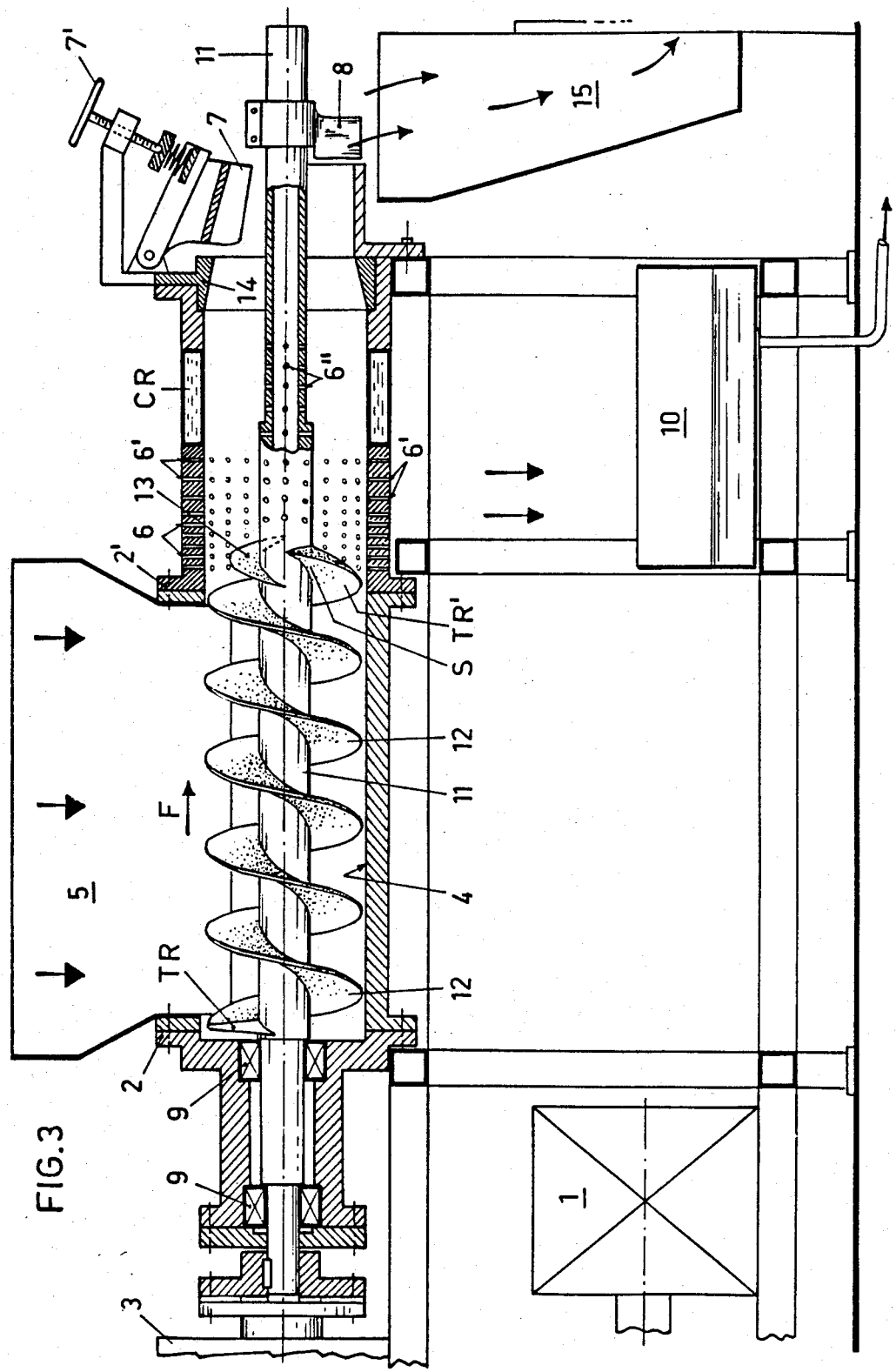
FIG. 3 is a vertical cross sectional view of the drier of FIG. 2.
Figure 4:
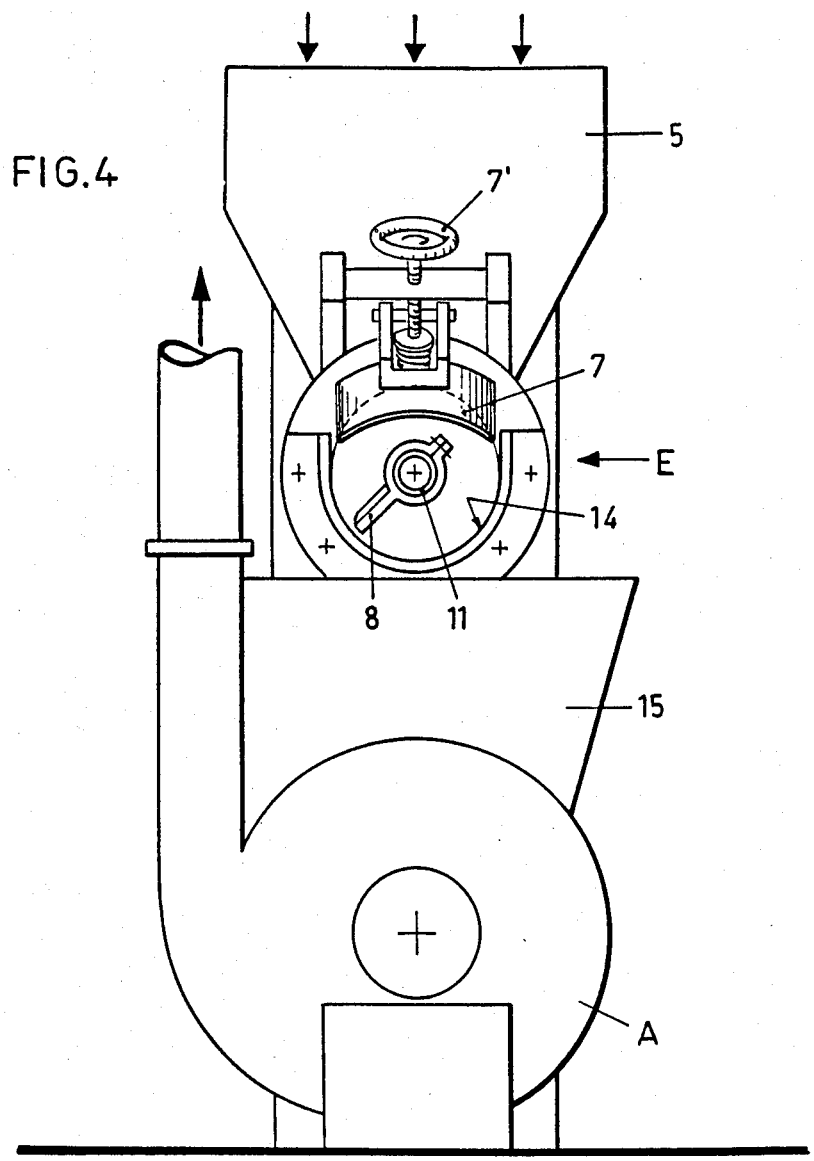
FIG. 4 is a front elevational view of the drier of FIG. 2.
Figure 5:
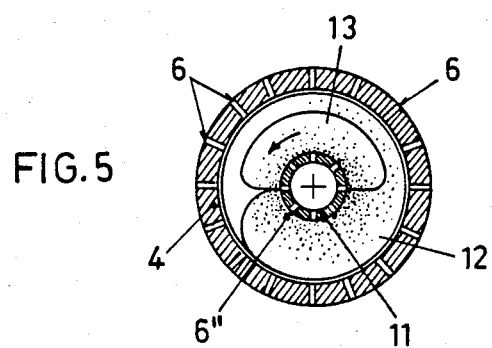
FIG. 5 is a cross sectional view of the drying channel in the area of the semicircular section operating like a knife.

FIG. 3 shows the apparatus for carrying out the drying operation through the whole channel in a more comprehensive way. The material is placed in channel 4 through the hopper 5 and is advanced by the screw conveyor, the shaft 11 of which is equipped with suitably shaped helical vanes 12 only in the section between the first connection flange 2 for the hopper 5 of channel 4 and the second flange 2' connecting said hopper to said channel. The final turn of helical vane 12 extends beyond the limit of flange 2' to end in the right angle section TR', disposed at 90° to shaft 11, in the same way as the initial right angle section TR of the first turn. The thickness S of the final turn of vane 12 with section TR' at 90° to the shaft is greater than that of the other turns, starting from the base and tapering toward the truncated cone top.

Therefore, starting from the final turn of helical vane 12 of the shaft 11, and going toward the outlet, the action of the screw conveyor to push the material out stops. This thus creates an area of maximum force, in which the material continues to advance to the outlet but under considerably more stress than in the preceding section of channel 4. To prevent hardening of the material and to overcome its tendency to solidify, particularly in layers near the shaft 11, a section 13 approximately semicircular in shape is mounted on the screw shaft 11, starting from half-way between the last turn and the section TR' at 90° to the shaft and continuing beyond said section TR', for an extension of no more than 180°. As shown in FIG. 3, section 13 is not as high as the turns 12 and is parallel to them. Said section 13 thus serves to break up the hardened material and to facilitate advancement into the high pressure area in the direction of the outlet.

Water is expelled from the material in the area of the drying channel 4 at the outlet end, through openings 6, 6' distributed more densely in the high pressure section and less so in the following one. FIG. 3 shows how the openings 6 are denser in the area from the connection flange 2' until just beyond the section TR' of the last turn at 90° to the shaft. It also shows how openings 6' are less dense in the subsequent section. In other words, the invention provides greater possibility of expulsion in the high pressure section. The water expelled from openings 6,6' is collected in tank 10 and disposed of.

The screw shaft 11 is solid in the first section, where it rotates on tapered roller bearings 9 designed to withstand the great stress on shaft 11 which, for the remaining section, is suspended. For the other section, the shaft 11 is hollow to lighten it. In any case, in the final section, that is starting from the high pressure area, it has openings 6" which allow the inner layers of material to expel water more easily toward the inside of the shaft rather than through openings 6,6' described above. The water in the shaft 11 from said openings 6" is discharged at the end of the shaft.

Downstream from the less dense openings 6' is the U-shaped collar CR. As already mentioned, a heating liquid is circulated in said collar for certain materials where the friction generated by advancement does not produce sufficient heat to completely evaporate the water.

Thus the material advanced by the screw, broken up by section 13 and eventually heated by collar CR, approaches the outlet of drying channel 4. This area has a solid truncated cone collar 14 tapering radially inwardly in the downstream direction along the extreme edge of the channel 4. Above the discharge end of channel 4 downstream of collar 14 is a flap door 7 pivotally mounted on channel 4, such as by a hinge with its height or position being adjustable by hand wheel 7', and having a semicircular surface adapted to approximately the shape of the mass of material being discharged, reduced in diameter via collar 14. Collar 14 and flap door 7, with adjustable height, are designed to facilitate compression inside the drying channel.

Finally, at the end of the shaft 11, downstream from the flat door 7, a blade 8 is joined to said shaft to rotate therewith which acts as a blade to break up the material being discharged before it falls into container 15, from where a centrifuge sends it to the subsequent phases of the operation.

It may be noted that a screw drier according to the invention designed for a yield of approximately 400 kg/h uses approximately 20 Kw/h. The same yield from an electrical resistance tunnel would require a power of approximately 200 Kw/h, or the equivalent in diesel fuel or steam. Of course, to these costs must be added that of a contract for that Kw potential when it is entered into and the pro-rated payments thereof. Moreover, it is significant that increasing the hourly yield by 100 kg has no effect on the power used by the drier according to this invention, while an electrical resistance tunnel would require an increase of approximately 40%.

The object of the invention has been described and illustrated with reference to one possible embodiment. Of course, variations in proportions, size and arrangement are possible, without departing from the bounds of the invention.

I claim:

1. A tunnel drier for waste plastic materials in small particles comprising:
   a drier casting having a feed opening;
   an elongated cylindrical walled channel in said casing having an inlet section adjacent said feed opening and a discharge end and forming a first chamber in said inlet section and a second chamber connected in series between said first chamber and said discharge end;
   a hopper for feeding the plastic material attached to said casing having a discharge opening in the bottom thereof communicating with said feed opening in said casing through which the plastic material is fed to said first chamber;
   a screw conveyor comprising a shaft and a helical vane mounted coaxially on said shaft, said shaft being solid in the portion thereof in said first chamber and hollow downstream thereof;
   means to rotatably support said shaft coaxially in said channel at the upstream end thereof adjacent said inlet section;
   means to rotate said shaft;
   a plurality of liquid outlet holes in said shaft in the portion thereof between substantially the center of said second chamber and said discharge end;
   said helical vane extends continuously through said first chamber and has a laminar blade shape in said first chamber and a final turn extending into said second chamber a distance of substantially one turn, said final turn having the same radius as the preceding turn and a cross-sectional configuration in the form of a right triangle so that the downstream surface of said final turn forms an oblique helicoid which imparts to the material being treated a pressure which increases from the outer periphery of the final turn to the shaft;
   a half-turn segment of a laminar helical vane for breaking up the material having the same pitch as said first-mentioned vane and a radial height from said shaft approximately one-half the radial height of said first vane mounted on said shaft so that its upstream end is at substantially the same angular position as the downstream end of said final vane but displaced upstream therefrom substantially a distance of a half-pitch;
   a plurality of liquid outlet holes through the wall of a first upstream portion of said second chamber;
   heating means incorporated in the wall of a central portion of said second chamber to facilitate drying of the material passing therethrough;
   means for resisting flow of the material to produce a high pressure region in said second chamber between the downstream end of said helical vane and said discharge end; and
   a device operatively mounted on said discharge end for adjusting the area of said discharge end.

2. A drier as claimed in claim 1, wherein the upstream surface of the final turn of said helical vane extends at 90° to the shaft, the thickness of said last turn is greater than that of the other turns, the base of said right triangle is at the shaft and the hypotenuse defines the downstream surface of said final turn.

3. A drier as claimed in claim 1, wherein said liquid outlet holes in said wall of the second chamber are arranged in decreasing density downstream along at least part of the high pressure region.

4. A drier as claimed in claim 1, wherein said means to resist flow comprises a collar having a truncated cone shaped inner surface tapering radially inwardly in the discharge direction at said discharge end to form a discharge orifice.

5. A drier as claimed in claim 1, wherein said device for adjusting the area of the discharge end comprises a flap door pivotally mounted adjacent the discharge end of said channel, and a hand wheel operatively mounted between said casing and said flap door to adjust said door with respect to said discharge end, said door having an approximately semicylindrical surface directed toward said shaft adapted to have a shape conforming to the mass of material passing through the discharge opening.

6. A drier as claimed in claim 5 and further comprising a blade member mounted on the end of the shaft downstream from and adjacent to the flap door for rotation with said shaft to engage and break up the material being discharged through said discharge orifice, said blade member being substantially planar and projecting substantially radially from one side of said shaft.

7. A drier as claimed in claim 6, wherein said means to support said shaft comprises tapered roller bearings mounted in said casing in spaced relationship so that said shaft is cantilever supported thereby.

8. A drier as claimed in claim 1 wherein said segment of a helical vane extends parallel to said helical vane, and has an outer peripheral beveled knife edge to cut into and break up the material passing to the discharge end of said chamber.

* * * * *